United States Patent
Molina et al.

(10) Patent No.: US 11,797,031 B2
(45) Date of Patent: Oct. 24, 2023

(54) CARTRIDGE FLOW RATE ADJUSTING ASSEMBLY AND HYDRAULIC FLOW RATE CONTROL VALVE WITH A DUAL ADJUSTING SCALE

(71) Applicant: Giacomini S.p.A., San Maurizio d'Opaglio (IT)

(72) Inventors: Samuele Molina, San Maurizio d'Opaglio (IT); Giuliano Ruga, San Maurizio d'Opaglio (IT)

(73) Assignee: Giacomini S.p.A

( * ) Notice: Subject to any disclaimer, the term of this patent is extended or adjusted under 35 U.S.C. 154(b) by 0 days.

(21) Appl. No.: 17/433,813

(22) PCT Filed: Feb. 24, 2020

(86) PCT No.: PCT/IB2020/051543
§ 371 (c)(1),
(2) Date: Aug. 25, 2021

(87) PCT Pub. No.: WO2020/183265
PCT Pub. Date: Sep. 17, 2020

(65) Prior Publication Data
US 2022/0147067 A1    May 12, 2022

(30) Foreign Application Priority Data
Mar. 8, 2019    (IT) .......... 102019000003433

(51) Int. Cl.
*F16K 3/26*    (2006.01)
*G05D 7/01*    (2006.01)
*F16K 37/00*   (2006.01)

(52) U.S. Cl.
CPC ............. *G05D 7/0106* (2013.01); *F16K 3/26* (2013.01); *F16K 37/0016* (2013.01)

(58) Field of Classification Search
CPC .......... G05D 7/0106; G05D 7/01; F16K 3/26; F16K 3/262; F16K 37/0008; F16K 37/0016
(Continued)

(56) References Cited

U.S. PATENT DOCUMENTS 2,916,047 A * 12/1959 Butcher ............... G05D 7/0106
                                                 137/625.34
3,318,577 A *  5/1967 Banks .................... F16K 39/022
                                                       251/38

(Continued)

FOREIGN PATENT DOCUMENTS

WO   WO 2018/051150 A1 *  3/2018
WO   WO 2020/183265      *  9/2020

OTHER PUBLICATIONS

International Search Report in related international application PCT/IB2020/051543 dated Jun. 16, 2020; 3 pages.

(Continued)

*Primary Examiner* — John Bastianelli
(74) *Attorney, Agent, or Firm* — Mark Malek; Jonathan Staudt; Widerman Malek, PL

(57) ABSTRACT

A cartridge flow rate adjusting assembly for a hydraulic valve, may include a cartridge body, a stem that is slidingly disposed in the cartridge body, and a shutter to be slidingly placed against a passage opening. The cartridge flow rate adjusting assembly may further include a sleeve rotatively disposed inside the valve that may include at least one first opening to enable adjustment of a maximum flow rate of the valve within a first range of values, and according to a first scale at least one second opening made in the wall to enable adjustment of the maximum flow rate of the valve within a second range of values according to a second scale. A (Continued)

hydraulic control valve is also provided that comprises a cartridge flow rate adjusting assembly.

18 Claims, 8 Drawing Sheets

(58) Field of Classification Search
USPC ............ 251/282; 137/553, 556, 556.3, 556.6
See application file for complete search history.

(56) References Cited

U.S. PATENT DOCUMENTS

| | | | |
|---|---|---|---|
| 5,386,965 A | 2/1995 | Marchal | |
| 6,725,880 B1* | 4/2004 | Liu | G05D 7/0126 |
| | | | 137/553 |
| 8,469,052 B2* | 6/2013 | Jorgensen | F16K 3/32 |
| | | | 137/505.36 |
| 2013/0299017 A1* | 11/2013 | Evans | G05D 7/01 |
| | | | 137/553 |
| 2015/0362080 A1* | 12/2015 | Vu | F16K 27/02 |
| | | | 137/625 |
| 2016/0246306 A1* | 8/2016 | Giubertoni | G05D 7/0106 |
| 2017/0003692 A1* | 1/2017 | Braga | G05D 7/005 |
| 2018/0107231 A1* | 4/2018 | Svejnoha | G05D 7/0106 |
| 2018/0157277 A1 | 6/2018 | Guidetti | |

OTHER PUBLICATIONS

Written Opinion in related international application PCT/IB2020/051543 dated Jun. 16, 2020; 7 pages.

\* cited by examiner

CARTRIDGE FLOW RATE ADJUSTING ASSEMBLY AND HYDRAULIC FLOW RATE CONTROL VALVE WITH A DUAL ADJUSTING SCALE

RELATED APPLICATIONS

This application is a national phase Applications of and claims priority under 35 U.S.C. § 371 of PCT Application No. PCT/82020/051543 filed on Feb. 24, 2020 and titled CARTRIDGE FLOW RATE ADJUSTING ASSEMBLY AND HYDRAULIC FLOW RATE CONTROL VALVE WITH A DUAL ADJUSTING SCALE, which claims the benefit of IT 102019000003433 filed on Mar. 8, 2019, each of which is hereby incorporated by reference in its entirety.

TECHNICAL FIELD

The present invention refers to cartridge flow rate adjusting assembly and to hydraulic flow rate control valve with a dual adjusting scale.

More specifically, the present invention refers to a cartridge flow rate pre-adjusting control cartridge assembly with a stem-plug shutter and pre-adjusting sleeve suitable for simple-type hydraulic control valves provided with a hand command or which can be motorized or made thermostatic and which can integrate a dynamically balancing/compensating a flow rate system.

STATE OF THE ART

Fluid control valves for adjusting a fluid flow rate configured also for a static pre-adjustment are known and widely used in the hydraulic systems and thermotechnical systems. Said hydraulic valves are generally also provided with means for balancing or compensating the inlet pressures and are typically known as Pressure Independent Control Valves or PICVs.

These fluid valves are hydraulic devices typically used in thermotechnical applications in which the availability at the inlet of a constant flow rate of a liquid fluid, usually water, independently from the fluid pressure variations occurring upstream and downstream, is sought.

Said known types of valves for dynamically adjusting and balancing a flow rate, enable a more flexible and simplified design and manufacturing of hydropic systems in which the flow rate of a fluid thermal carrier towards the ends of one or more users, such as heat exchanges, radiators, fan convectors, is required to be constant. Moreover, the PICVs enable to adjust the flow rate independently from the fluid pressure conditions occurring upstream and downstream, maintaining constant a preset flow rate or a user required flow rate.

Said adjusting/balancing valves or PICVs typically comprise three adjusting assemblies: a pre-adjusting assembly for the flow rate configured to pre-select a maximum nominal flow rate at the inlet of a user, a feedback adjusting assembly, typically a shutter assembly, configured to adjust or choke the flow rate of a fluid thermal carrier required as a function, for example, of the environment temperature, and a balancing/compensating assembly configured to maintain constant the flow rate independently from the pressure conditions upstream and downstream the valve.

The PICVs generally comprise an actuator, such as a known electrothermal head provided with a pusher, capable of linearly actuating the stem, known also as valve cartridge, closing the plug shutter in the valve body for obstructing and closing the fluid passage. Typically, said actuator is implemented by a mechanical or electromechanical device, advantageously connected to an electronic central unit and configured to close the valve stem shutter, for example, as a function of the environment temperature. Further, these valves are typically provided with an adjusting knob system, actuatable by an operator, connected to an adjusting sleeve provided with openings configured to rotatively vary with the sleeve the cross-section in order to set the required maximum fluid flow rate value, for example, corresponding to the maximum thermal energy amount to be supplied.

Exemplary flow rate adjusting valves provided also with an assembly for dynamically balancing the flow rate are illustrated in documents WO-A-2018051150 and EP-A-3067772.

Another example of valves for dynamically adjusting and balancing a fluid flow rate is described in the European patent EP 3 201 500 (B1) in the name of the same Applicant and regarding a valve comprising means for adjusting the fluid static flow rate configured to change the cross-section of a passage port between a valve inlet and outlet and means for dynamically balancing the flow rate, configured to adjust the flow rate of the fluid exiting the valve, as a function of an entering fluid flow rate change. The dynamic balancing means comprise a perforated element interposed between the inlet opening and an intermediate chamber in order to enable a fluid passage only through at least one opening of the perforated element. In addition, an elastic element is disposed at a face of the perforated element facing the fluid inlet opening in the valve body so that, an increase of a pressure difference between the valve inlet and outlet is matched by an enlargement of the elastic element in order to reduce the passage area of the opening of the perforated element and to ensure a constant flow rate.

A serious drawback of these cited valve types is that each standardized valve size is characterized by a corresponding flow rate range inside which the adjustment is performed. Consequently, the valve manufacturers must supply many versions of the same type and size of a valve, each with a different pre-adjusting assembly according to the flow rate range in which the valve must operate. This fact causes to manufacture and store a greater number of elements and also to sell many versions of a same valve, which differ from each other only for the pre-adjusting sleeve.

OBJECTS OF THE INVENTION

The object of the present invention consists of overcoming and obviating, at least partially, the operative disadvantages and limits of the above given prior art. More particularly, an object of the present invention consists of providing a cartridge flow rate adjusting assembly cartridge flow rate adjusting assembly and a corresponding hydraulic valve (for example of a PICV type) capable to be configured and selected for operating in different flow rate ranges: a range with greater flow rate levels and one with smaller flow rate levels.

A further object of the present invention consists of providing a cartridge flow rate adjusting assembly cartridge flow rate adjusting assembly and a corresponding hydraulic valve (for example of a PICV type) having a high level of reliability and durability and such in addition to be easily and economically manufactured.

It is also an object of the present invention to provide a cartridge flow rate adjusting assembly cartridge flow rate adjusting assembly and a corresponding hydraulic valve (for example of the PICV type) which are capable to operate with small-sized economical actuators, in comparison with the known ones, for the same force required to cause the valve to close.

It is an object of the present invention a cartridge flow rate adjusting assembly cartridge flow rate adjusting assembly as defined in claim 1 and specific embodiments thereof described in dependent claims from 2 to 11. According to further aspect, it is an object of the invention a hydraulic valve described in claim 12 and a preferred embodiment thereof defined in claim 13.

BRIEF DESCRIPTION OF THE FIGURES

The structural operative characteristics of the cartridge flow rate adjusting assembly cartridge flow rate adjusting assembly and of the corresponding hydraulic valve object of the present invention could be better understood from the following detailed description, in which it is made reference to the attached drawings representing some preferred non-limiting embodiments, wherein.

DETAILED DESCRIPTION OF THE INVENTION

Figure 1:
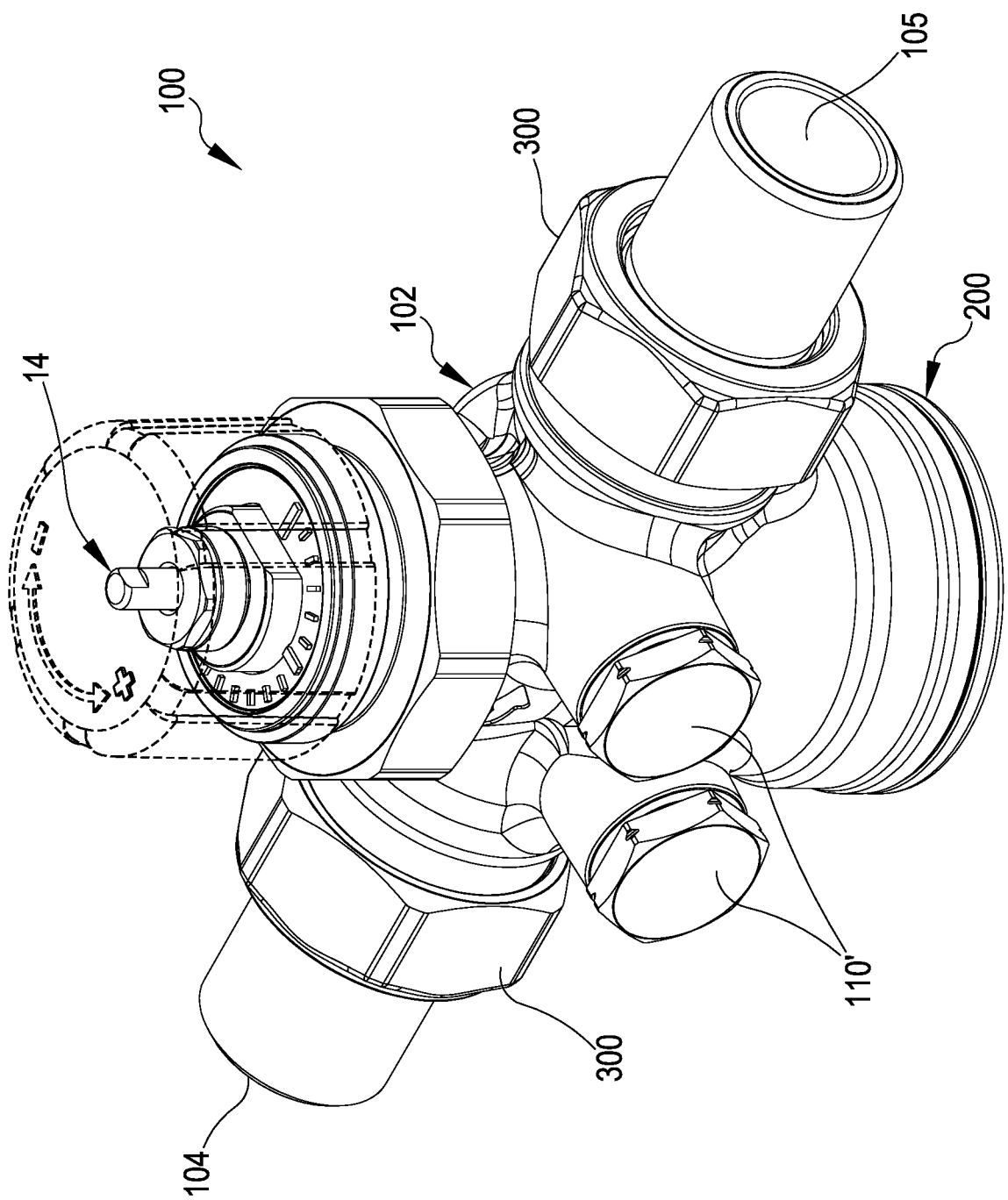
FIG. 1 is a schematic representation of an axonometric view of a hydraulic PICV comprising a cartridge flow rate adjusting assembly cartridge flow rate adjusting assembly object of the present invention.
Figure 2:
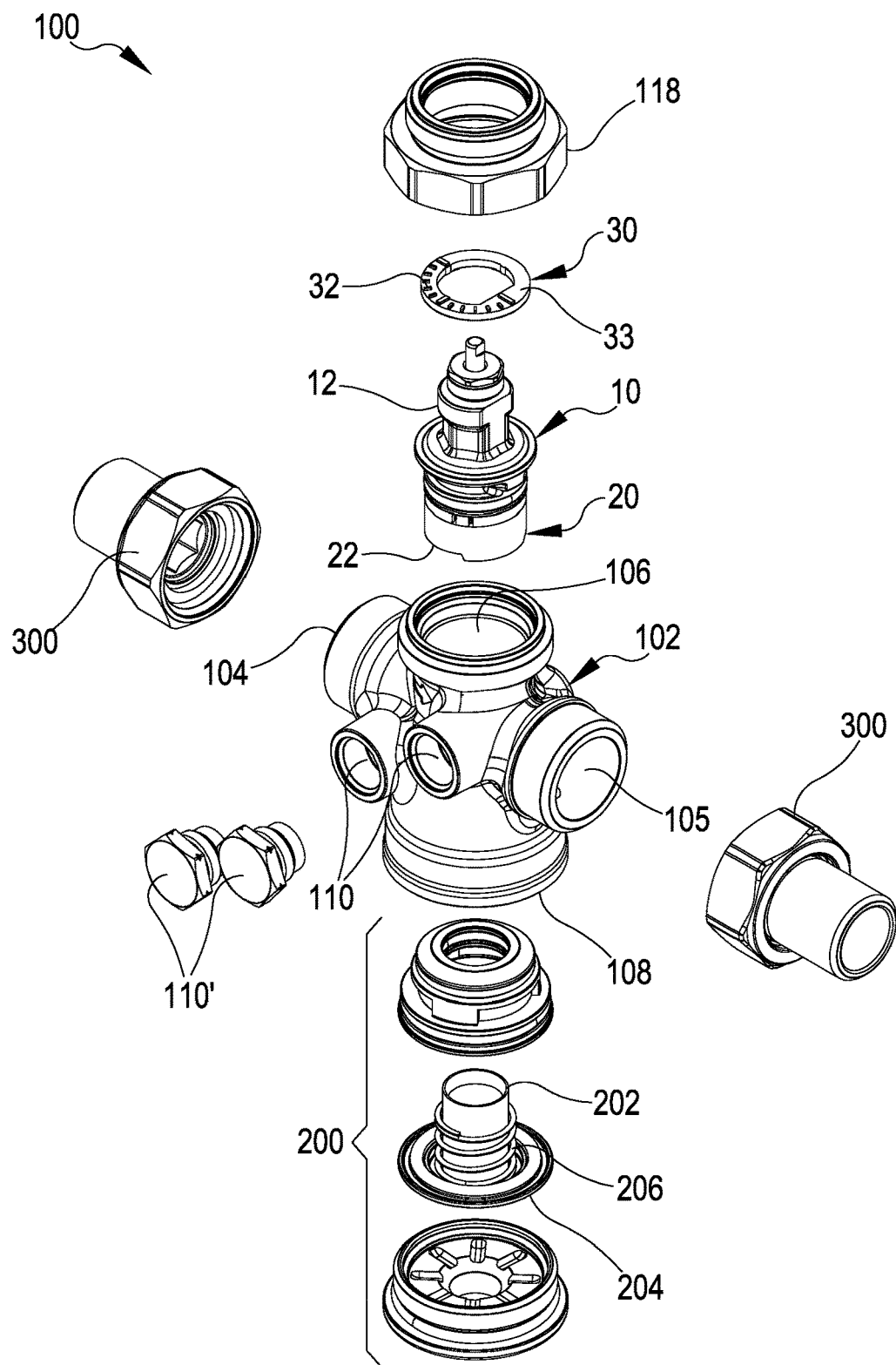
FIG. 2 is a schematic representation of an axonometric exploded view of a hydraulic PICV comprising a cartridge flow rate adjusting assembly cartridge flow rate adjusting assembly object of the present invention.

Referring to the figures and particularly to FIGS. 1, 2, 4, 5 and 6, a preferred embodiment of a hydraulic valve 100 of the PICV (Pressure Independent Control Valve) type is shown according to the present invention. Valve 100 comprises a valve body 102 having an inlet opening 104, an outlet opening 105 and an actuating opening 106. An opening 108 is made in the valve body 102, in particular in the PICV type, in which a per se known dynamic balancing/compensating pressure assembly 200 is received.

Such balancing assembly 200 generally comprises a tubular element 202 slidingly actuated by a flexible diaphragm 204 (for example made of an elastomeric material) sensitive to the fluid pressure in the inlet opening 104 on a face thereof and to a fluid pressure in the outlet opening 105, on an opposite face thereof in order to cause the tubular element 202 to increase or limit the fluid flow in the valve as a function of the pressure difference $\Delta p$ between the inlet opening 104 and outlet opening 105. Moreover, the balancing assembly 200 typically comprises also an elastic element 206 configured to hold the tubular element 202 in a monostable position (for example, in an opening position).

Typically, the valve body 102 comprises also one or more service openings 110 configured to service and control the valve 100 when is installed; said service openings 110 are usually closed by plugs 110'.

Valve 100 is provided with an inner wall 112 with a passage opening 114 suitable for a cartridge flow rate adjusting assembly cartridge flow rate adjusting assembly 10 and said balancing assembly 200.

Normally the valve 100 can be also provided with conventional connecting connectors 300 placed at the inlet and outlet openings 104 and 105.

The attached figures, and particularly FIGS. 3, 4, 8 and 9, illustrate a cartridge flow rate adjusting assembly cartridge flow rate adjusting assembly 10 comprising a generally cylindrical shaped cartridge body 12 slidingly receiving a stem 14. Said cartridge flow rate adjusting assembly cartridge flow rate adjusting assembly 10 is inserted in the valve body 102 at the actuating opening 106.

A shutter 16 (a plug, for example) attached to a first end 14' of the stem 14, inside the valve 100, is configured to slide against the passage opening 114 of the valve 100 in order to adjust the fluid flow by the same, from a maximum amount to a complete closure thereof. A second end 14" of the stem 14 is exposed outside the valve body 100 and is configured to engage with a conventional mechanical or electromechanical actuator (not shown) destined to linearly move the stem 14 in order to close or open the passage opening 114 by the shutter 16.

Said stem 14 is also provided with a further elastic element 18 (a coil spring, for example) coaxially placed around the stem 14 and in the cartridge body 12 in order to hold the stem 14 with the shutter 16 in a monostable position normally open with respect to the opening 114 of the body 102. Said stem 14 and said elastic element are held in position in the cartridge body 12 by means of a first ferrule 19.

The cartridge flow rate adjusting assembly cartridge flow rate adjusting assembly 10 (in the following briefly indicated by cartridge 10) further comprises a substantially tubular cylindrical shaped sleeve 20 attached to an inner end of the cartridge body 12.

Figure 6:
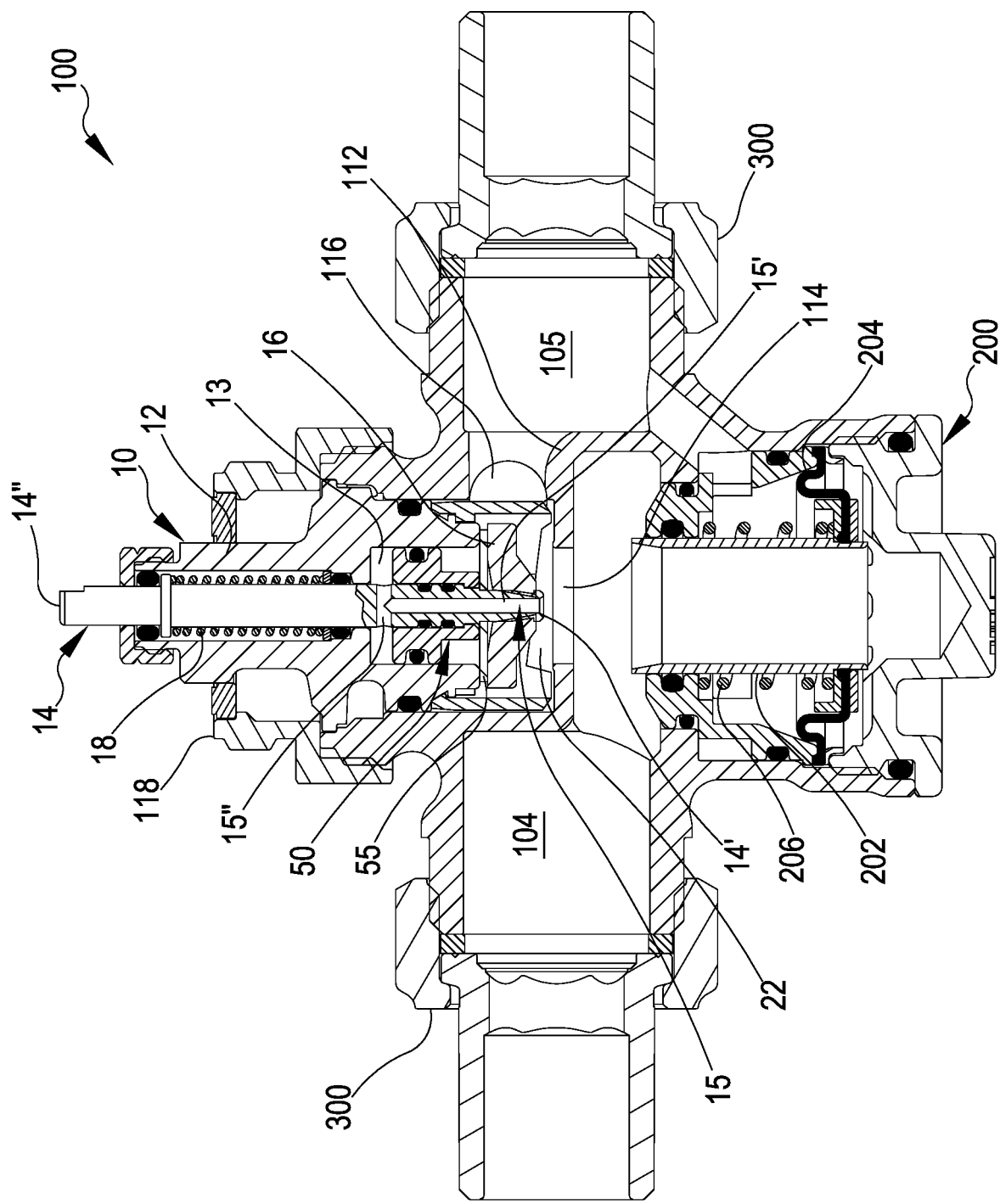
FIG. 6 is a schematic representation of a cross-section view according to the plane VI of FIG. 5 of the hydraulic PICV comprising a cartridge flow rate adjusting assembly object of the present invention.
Figure 7:
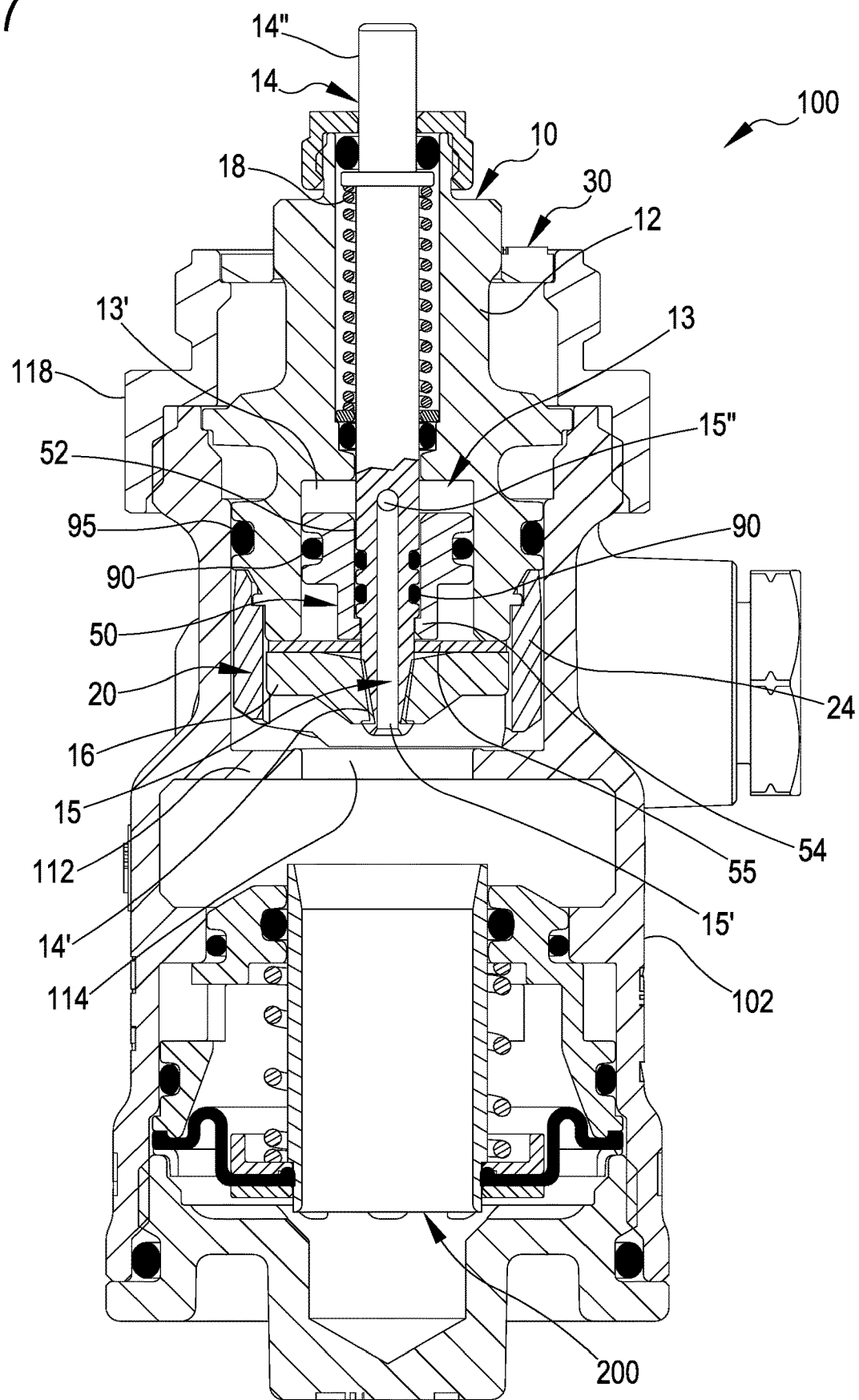
FIG. 7 is a schematic representation of a cross-section view according to the plane VII of FIG. 5 of the hydraulic PICV comprising a cartridge flow rate adjusting assembly object of the present invention.
Figure 8:
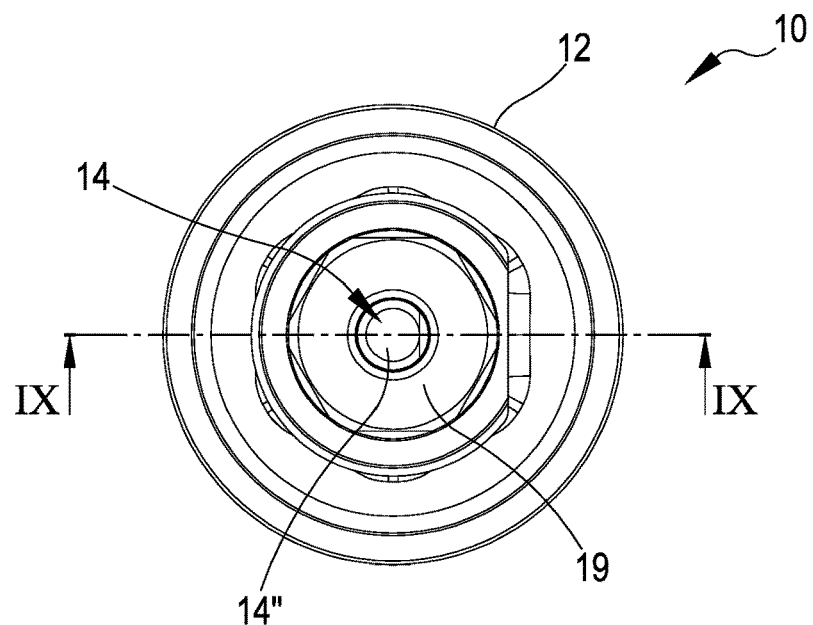
FIG. 8 is a schematic representation of a plan view of the cartridge flow rate adjusting assembly object of the present invention.

Referring particularly also to FIGS. 6 and 7, said sleeve 20 is configured to adjust and limit the fluid flow exiting the passage opening 114 in the valve body 102 and moving towards the outlet opening 105 through at least one first shaped opening 22 and at least one second shaped opening 22' made in the outer cylindrical wall 24 of the sleeve itself. The shape of the first opening 22 is such to enable to adjust the maximum flow rate of the valve inside a first range of fluid flow rate values according to a first scale. The shape of the second opening 22' is such to enable to adjust the maximum flow rate of the valve inside a second range of the fluid flow rate ranges according to a second scale. FIGS. 6 and 7 show the shutter in a non-operative transition configuration.

A first resolution is associated to said first scale and a second distinct resolution is associated to said second scale. The term "resolution" means the flow rate range obtainable as a function of the sleeve 20 rotation of a preset angular value.

Said first and second openings 22 and 22' of the sleeve 20 enable to preset the fluid maximum flow rate exiting the valve by rotating the sleeve itself, varying the passage cross-section towards the outlet opening 105.

The first and second openings 22 and 22' can have an open shape at the free end of the sleeve 20 (as shown in the figures) or can be integrally circumscribed in the cylindrical wall 24. The first and second openings 22 and 22' are formed on portions of the cylindrical part 24 of the sleeve 20 which are separated by solid portions of said cylindrical wall 24 in order to selectively operate (in other words not simultaneously) to adjust the fluid flow rate. Preferably, the first shaped opening 22 and second shaped opening 22' are made on portions at diametrally opposite positions of the cylindrical wall 24.

Moreover, each said first and second shaped openings 22 and 22' have a cross-section facing a passage gap 116 of the valve body 102 varying as a function of the sleeve 20 rotation. When the first shaped opening 22 faces said passage gap 116, the second opening 22' is in a non-operative mode, distally from the passage gap 116 (and viceversa). Each said first and second openings 22 and 22' can in turn comprise, more than one opening formed in the cylindrical wall 24, having cross-sections equal to or different from each other, configured to simultaneously or continuously face the passage gap 116.

According to the example in the figures, the first opening 22 has a greater size and the second opening 22' has a smaller size, for being capable of presetting two operative configurations of the valve 100, alternative to each other, in two different fluid flow or flow rate ranges.

Advantageously, said sleeve 20 can be made of a plastic material, polymeric or thermoplastic, metal or of other synthesized materials o can be made by additive manufacturing techniques. Advantageously, the sleeve 20 is attached to the cartridge body 12 by pressure snapping means 25 formed on the inner diametral surface of the sleeve and on the end diametral surface of the cartridge 12.

Figure 3:
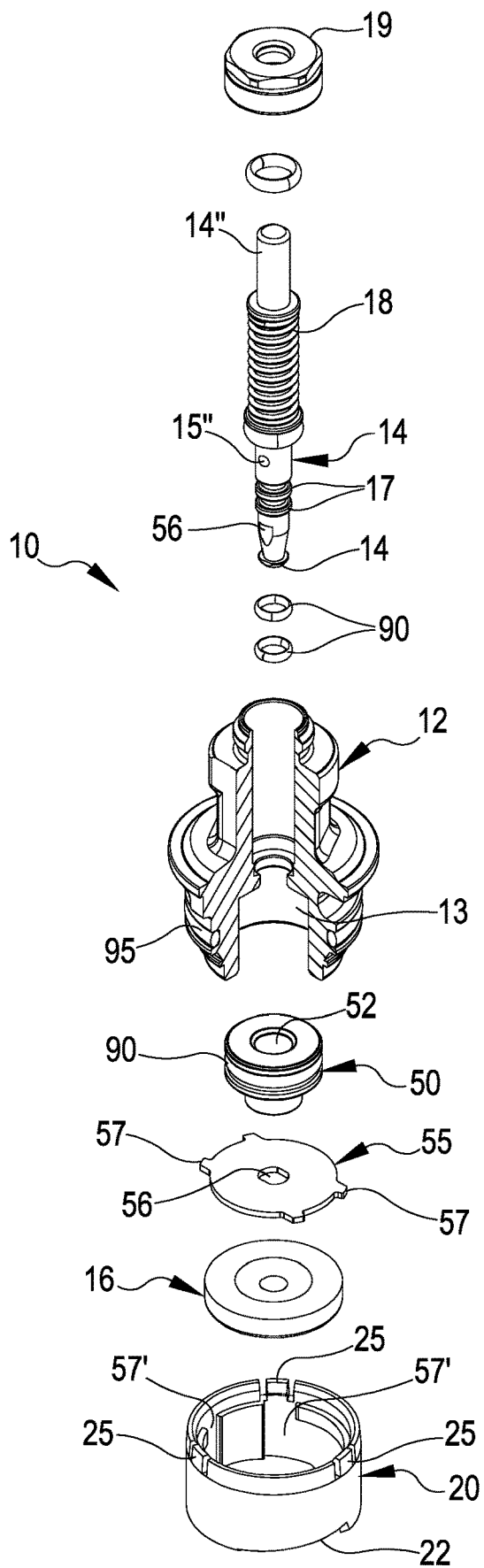
FIG. 3 is a schematic representation of an axonometric exploded view of a cartridge flow rate adjusting assembly cartridge flow rate adjusting assembly of a hydraulic valve object of the present invention.
Figure 4:
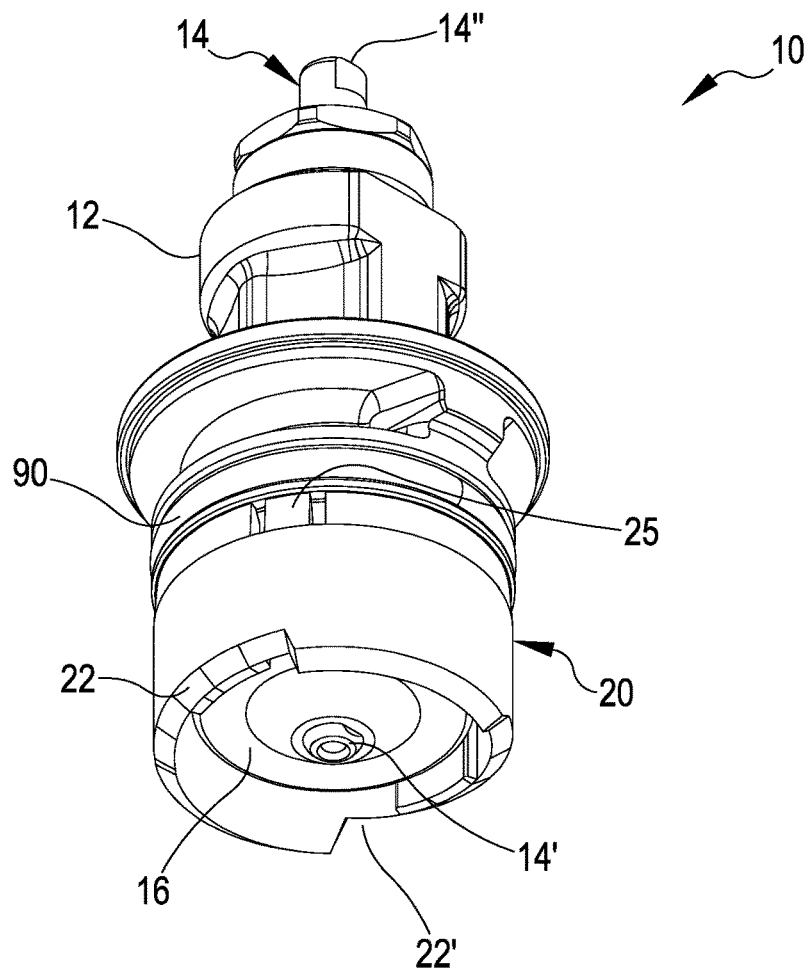
FIG. 4 is an axonometric schematic representation from another point of view of the cartridge flow rate adjusting assembly cartridge flow rate adjusting assembly of the hydraulic valve object of the present invention.
Figure 5:
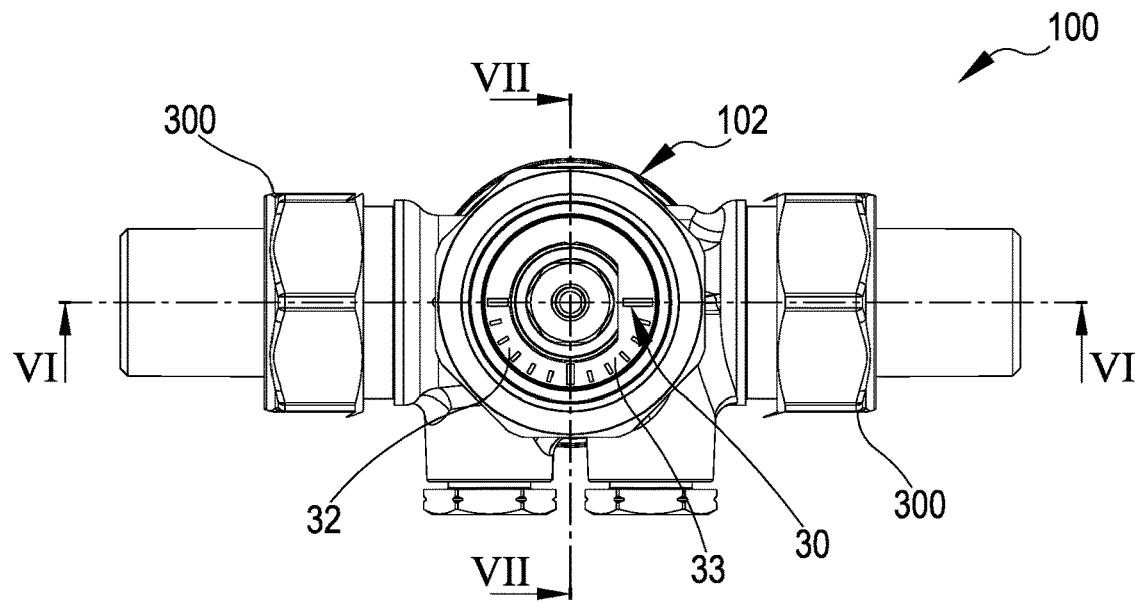
FIG. 5 is a schematic representation of a plan view of the hydraulic PICV comprising a cartridge flow rate adjusting assembly cartridge flow rate adjusting assembly object of the present invention.

The sleeve 20 can be put in rotation with the shutter body 12, but can also be put in rotation by the plug or washer 55 of the shutter 16 integral with the stem 14 by connecting means 56 to the stem itself, such as for example flat portions made on the first end 14' of the stem 14 mated with a non-circular shaped opening of the plug or washer 55, as shown in FIG. 3.

Still specifically referring to FIG. 3, acting on the stem 14 by a conventional wrench, at the second end 14", rotates the stem with the plug 55 which in turn puts in rotation the sleeve 20 by at least one protrusion 57 mated to a respective groove 57' formed on the inner surface of the sleeve 20.

Further, said cartridge 10 comprises graduated reference means 30 on the cartridge 10 itself (a disk, for example) or directly formed on it. The reference means 30 are configured to graphically show, outside said valve 100, said first and second scales and are placed on the cartridge body 12.

Said reference means 30 are divided in at least two parts and comprise a first graduated scale 32 corresponding to the open positions of the first shaped opening 22 and a second graduated scale 33 corresponding to the open positions of the second shaped opening 22'.

The cartridge 10 can be stationary or rotative in the valve body 12 by a second ferrule 118 (FIG. 2) attached at the actuating opening 106. According to a further embodiment, the cartridge 10 is integral with the valve body 12.

Referring particularly to FIG. 1, in the preferred embodiment of the figures, the cartridge 10 is adjustable by a wrench acting on the second end 14" of the stem 14 and configured to rotate said stem 14 and consequently the sleeve 20 with respect to the cartridge body 12, for pre-adjusting the control valve 100. Once performed the pre-adjustment, it is possible to install an actuator (not shown) provided with a linear operation or an electrothermal head, disposed at the actuating opening 106 of the valve 100 and configured to cooperate with the stem 14 of the cartridge 10.

Figure 9:
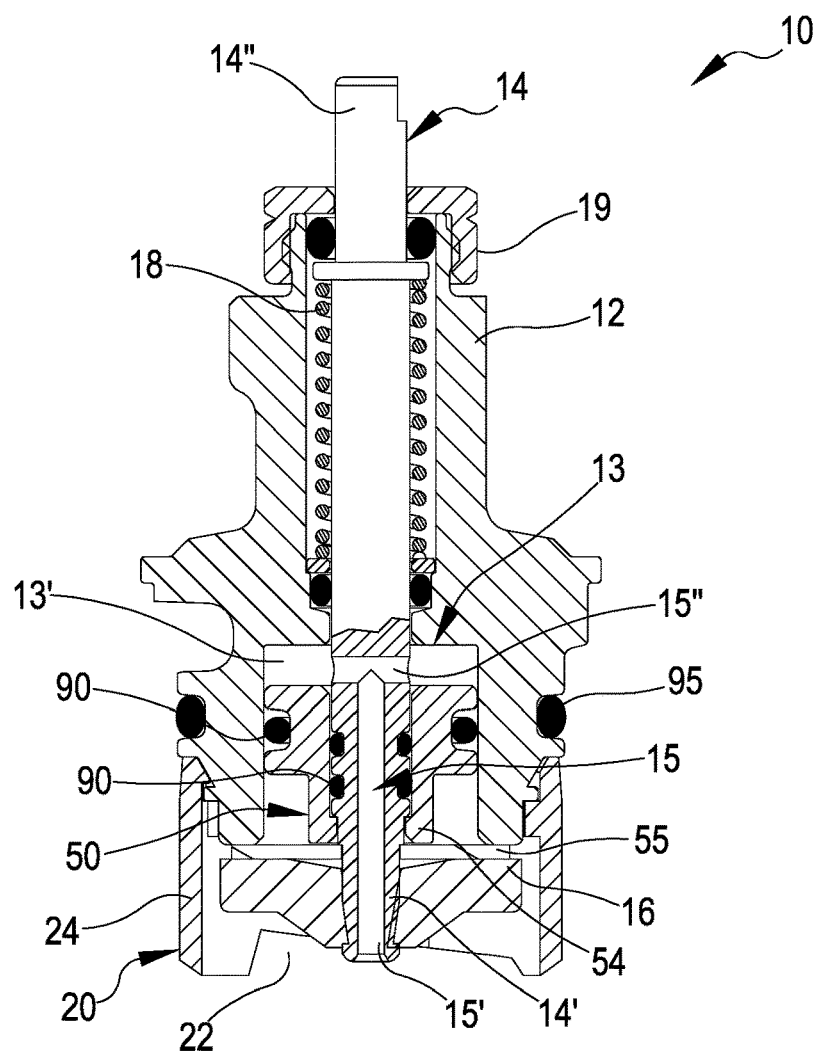
FIG. 9 is a schematic representation of a cross-section view according to the plane IX of FIG. 8 of the cartridge flow rate adjusting assembly object of the present invention.

Referring particularly to FIGS. 6, 7 and 9, in a preferred embodiment, the stem 14 of the cartridge assembly 10 can also comprise a compensating duct 15 (FIG. 9) partially extending along the axis of the stem 14 itself and having an opening 15' at the first end 14' and at least a further opening 15" at the outer diametral surface of stem itself. The further opening 15", on the outer diametral surface of the stem 14, is in fluid communication with a chamber 13 made in the cartridge body 12.

The shape of the compensating duct 15 can be curved.

The inside of said chamber 13 receives, through a central hole 52, a plunger 50 integral with the stem 14 so that it slides with the same stem inside said chamber 13. The plunger 50 is attached to the stem 14 by fixing means 54 comprising, for example, elastically deformable snapping means. Particularly, the fixing means 54 comprise one or more diametral collars formed on the inner surface of the central hole 52 and cooperating with further lateral collars 17 formed on the lateral outer surface of the stem 14. Moreover, the plunger 50 is prevented from axially translating towards the first end 14' of the shutter 16 attached to the same end of the stem 14. For example, said shutter 16 can be advantageously disposed on the stem 14 by a plug or washer 55 configured to move the shutter 16 in abutment with the cartridge body 12.

Advantageously, the plunger 50 is made of a plastic material, thermoplastic, polymeric or thermopolymeric or metal material, or of other sintered materials or can be made by additive manufacturing techniques.

The opening 15" of the compensating duct 15 can comprise a transversal hole or duct (for example, radial) which can be through, in other words it extends along all the cross-section of the stem 14 or partially extends in the stem 14 so that it is anyway in fluid communication with the compensating duct 15 and chamber 13. The plunger 50 is also provided with fluid tight elements 90 (lip gaskets, O-rings of elastomeric material, for example) disposed between the inner diametral surface of the central hole 52 and outer diametral surface of the stem 14, and between the outer diametral surface of the plunger 50 and inner diametral surface of the chamber 13.

Particularly, the further opening 15" is in communication with a portion 13' of the chamber 13 interposed between the plunger 50 and second end 14" of the stem 14. More particularly, such portion 13' of the chamber 13 on which the further opening 15" is formed, is interposed between the plunger 50 and elastic element 18. It is observed the portion 13' is always fluid tight with respect to the passage opening 114.

Advantageously, said sealing elements 90 can be received in suitable annular housings or recesses formed on the outer surface of the plunger 50 and stem 14.

Advantageously, the cartridge 10 can be provided with a sealing element 95 such to ensure the fluid tightness between the cartridge 10 itself and valve body 12.

The operation, described in the following, can be understood from the beforehand given description of the valve 100.

The cartridge 10 inserted in the valve 100 of the present description has the advantageous characteristic of a sleeve 16 capable of enabling the valve 100 to operate with different or very different flow rate scales, different size from each other. For example, it is possible to operate according to a configuration for high fluid flow applications and a low fluid flow with the same valve and the same inner components.

More particularly, during the installation step, an operator can configure the valve according to a preselected configuration by the wheel 400 by rotating the cartridge 10 and the sleeve 20 integral with the former. For example, the operator selects an operative range corresponding to a configuration by rotating the wheel 400 and cartridge 10 according to the first graduated scale 32 by different opening degrees corresponding to different positions of the first shaped opening 22 facing the passage gap 116. With such configuration, the second shaped opening 22' is inactive distally from the passage gap. Analogously, the operator can configure the valve 100 by rotating the wheel 400 on the second graduated scale 33, in order to operate with the second shaped opening 22' facing the passage gap 116.

Different positions of the cartridge 10 referring to each of the first and second graduated scales 32 and 33 correspond to different selected flow rates from a minimum to a maximum one associated to two different operative configurations. When the sleeve 20 is switched from a configuration to another, it is placed in a non-operative intermediate position clearly different from the two operative configurations. The term non-operative position means a position wherein the outer cylindrical part 24 faces the passage gap 116 without an adjusting configuration of the first and second openings 22, 22' in which no fluid passage or only a limited fluid passage is available. Generally, setting a minimum value of the configuration ranges on one of the graduated scales 32 and 33 causes the fluid flow rate to be never completely obstructed.

Referring particularly to FIGS. 1, 6 and 7, if the valve 100 is required to be closed by the shutter 16, the electromechanics actuator (not shown) acts on the second end 14' of the stem 14, downwardly thrusting it, overcoming the force of the further elastic element 18, for moving the shutter 16 in contact with the edge of the passage opening 114, obstructing the fluid passage between the inlet opening 104 and outlet opening 105.

Being the chamber 13 in fluid communication with the passage opening 114 by the compensating duct 15, cause a pressure P1 of the fluid flowing through and at the passage opening 114 to be equal to a pressure P2 in the chamber 13, during the closure step of the shutter 16. Therefore, a force F2 is generated which acts on the plunger 50 surface facing the chamber 13, opposing a force F1 exerted by the pressure P1 of the flowing fluid, compensating the same. This enables the shutter 16 to be actuatable by the corresponding stem 14 by a reduced force of the electromechanical actuator and mainly generated by the further elastic element 18, which generally remains constant as the pressure P1 increases.

The opening 15' of the compensating hole 15 is move to a position adjacent to the closure of the shutter 16 at the passage opening 114, so that the same pressure contrasting the shutter 16 closure is transferred into the chamber 13. This feature allows for an accurate compensation which neutralizes the forces acting on the shutter 16 by a force having the same magnitude exerted on the plunger 50 surface facing the chamber 13.

Figure 10:
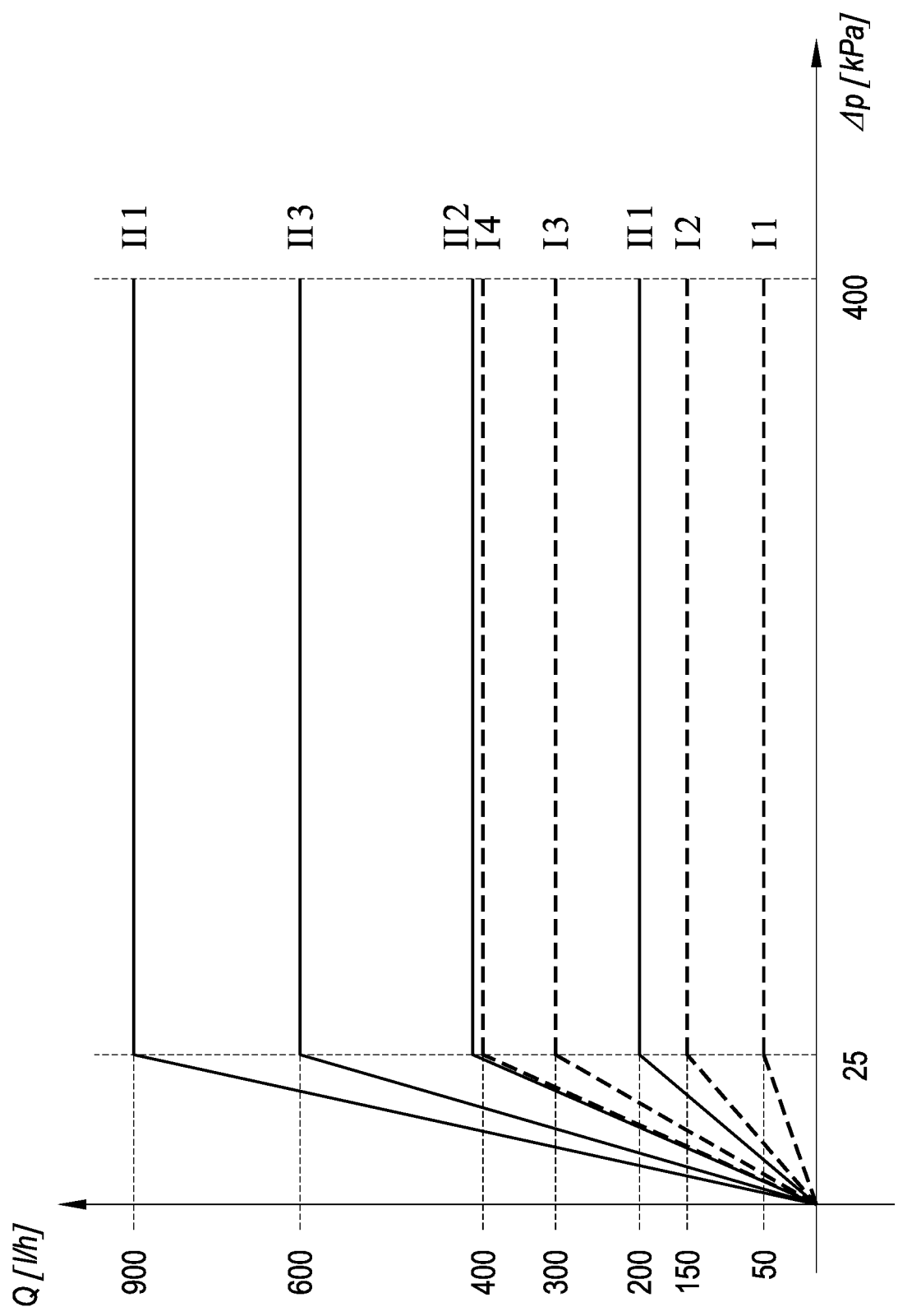
FIG. 10 is a schematic representation of an operation graph of a hydraulic PICV comprising a cartridge flow rate adjusting assembly object of the present invention, for adjusting a fluid flow rate with different ranges and different resolutions as a function of the value of the pressure difference $\Delta p$.

FIG. 10 particularly illustrates a graph with real values of the fluid flow rate expressed by l/h (liters per hour) as a function of the range of values of the pressure difference Δp, expressed in kPa (kilopascal) between the inlet opening 104 and outlet opening 105 of the valve 100. It is observed from the shown values that rotating the sleeve (20) through the first opening 22 and second opening 22' obtains two different adjustment ranges shown in FIG. 10 by the Roman numerals I and II respectively at a low flow I (50-400 l/h) and at a high flow II (200-800 l/h). Roman numerals from 1 to 4 of the values selectable by the first and second graduated scales 32, 33 differ from each other besides from a different flow rate also for a different resolution between a level and another on the two ranges. While a range I is matched by a resolution of about 100 l/h, a range II is matched by a resolution of about 200 l/h.

From the preceding illustration, the obtained advantages of the valve for hydraulically adjusting and balancing a fluid flow rate object of the present invention are clear.

The cartridge assembly and the corresponding hydraulic valve 100 are particularly advantageous since they enable to obtain a valve adjustable according to two different flow rate ranges, overlapping partially on each other or also completely distinct from each other and enable to balance the flow rate inside a range of values of Δp on both the ranges.

A further advantage of the valve is the implementation of one device or one valve in one version for each standardized size, without requiring to provide two versions of the same valve differing only for the pre-adjustment range of the flow rate the sleeve 20 can obtain, consequently manufacturing, storing and marketing savings are obtained since only a single type of an off-the-shelf valve is needed due to the standard size of the connections.

The present invention is also particularly advantageous since provides a user a hydraulic valve 100 with a conventional type thermostatic plug shutter or with a pressure balancing such to ensure a better resolution of the fluid flow rate pre-adjustment, since it can operate between two ranges having two scales with different values. Indeed, valve 100 according to the present invention enables to make the hydraulic system in which the valve is installed, more versatile and adaptable to possible following expansions requiring to increase the available flow rates or, generally, to changed conditions due to, for example, design mistakes or not considered parameters, without requiring to substitute the valve 100.

The cartridge assembly and corresponding hydraulic valve 100 object of the present invention are further advantageous in the embodiment of the figures since they provide to compensate a force acting on the shutter during the closing step, enable to use smaller and economical actuators and with small power consumption with respect to the ones used according to the prior art. It is observed the use of a small-sized actuator is advantageous also from a point of view of the size, since enables to install a valve in cramped spaces and cassettes. Moreover, using a duct extending inside the stem does not jeopardize the stroke of the stem itself. A further advantage of the described structure is that the compensating pressure inside the chamber 13 is exactly as the one acting on the shutter 16 at the passage opening 114 of the valve 100. The fluid flow pressure at said passage opening 114 is indeed slightly less than the other parts of the valve due to the Venturi effect. The fluid connection between the passage opening 114 and chamber 13, through the compensating duct 15, ensures a perfect balancing of the forces generated by the pressures on the plunger 50 and an accurate closure, for example, also by a feedback by electromechanical actuators such as, for example, electrothermal heads.

While the above described invention was described by particularly referring to some preferred embodiments, given in an exemplifying non-limiting way, many modifications and variants will appear to a person skilled in the art in the light of the above discussed description. Consequently, the present invention intends to encompass all the modifications and variants falling in the scope of the following claims.

The invention claimed is:

1. A flowrate adjusting cartridge assembly for a hydraulic valve comprising:
   a cartridge body;
   a stem slidingly disposed in the cartridge body, having a first end;
   a shutter that is integrally formed with the first end of said stem; and
   a substantially cylindrical sleeve configured to be rotatively disposed inside the hydraulic valve to face a passage gap, wherein the sleeve includes at least one first shaped opening formed in a portion of an outer cylindrical wall of the sleeve and suitable to enable adjustment of a maximum flow rate of the hydraulic valve within a first range of values according to a first graduated scale;
   wherein said sleeve comprises at least one second shaped opening formed in a portion of said outer cylindrical wall at a diametrally opposite position with respect to said first opening, and such to enable adjustment of the maximum flow rate of the valve within a second range of values according to a second graduated scale to preset two operative configurations of the valve alternative to each other, in two different fluid flow ranges or flow rate ranges; and
   wherein said first range of values through said first shaped opening is 50 l/h-400 l/h and said second range of values through said second shaped opening is 200 l/h-800 l/h.

2. The flowrate adjusting cartridge assembly according to claim 1, wherein at the flow rate adjustment of the sleeve according to said first graduated scale a first flow rate resolution is associated, whereas at said flow rate adjustment of the sleeve according to said second graduated scale a distinct second flow rate resolution is associated.

3. The flowrate adjusting cartridge assembly according to claim 1, comprising graduated reference means configured to graphically represent said first and second graduated scales.

4. The flowrate adjusting cartridge assembly according to claim 3, wherein said graduated reference means comprising said first graduated scale corresponding to the opening positions of said at least one first opening, and said second graduated scale corresponding to the opening positions of said at least one second opening.

5. The flowrate adjusting cartridge assembly according to claim 4, wherein said first and second graduated scales are at least one of represented on the flowrate adjusting cartridge assembly, and directly formed on the flowrate adjusting cartridge assembly.

6. The flowrate adjusting cartridge assembly according to claim 1, wherein each of said at least one first opening and said at least one second opening comprises a plurality of openings formed in the wall of the sleeve.

7. The flowrate adjusting cartridge assembly according to claim 1, wherein said sleeve is made of a material selected from the following group of materials: plastic, polymeric, thermoplastic, metal, or of other sintered materials.

8. The flowrate adjusting cartridge assembly according to claim 1, further comprising:
   an elastic element coaxially disposed on the stem of the cartridge body so that the stem is held in a monostable position with respect to the passage opening;
   a plunger element integrally formed with the stem and configured to slide in a chamber of said cartridge body coaxial with said stem and interposed between the shutter and a second end of the stem; and
   a compensating duct positioned within said stem and having:
      a first opening at the first end of the stem configured to be in fluid communication with the passage opening of the valve, and
      at least one second opening fluidically communicating with a portion of the chamber disposed between the plunger and the second end, so that a pressure in said portion of the chamber is equal to a pressure at the passage opening.

9. The flowrate adjusting cartridge assembly according to claim 8, wherein said chamber is interposed between the shutter and the elastic element and wherein said portion of the chamber is interposed between the plunger and the elastic element.

10. The flowrate adjusting cartridge assembly according to claim 8, wherein the compensating duct comprises a conduit axial with the stem, and fluidically communicating with at least one conduit transversal to the stem having said at least one second opening.

11. The cartridge assembly according to claim 1, wherein said sleeve is made by an additive manufacturing technique.

12. A hydraulic control valve comprising a flowrate adjusting cartridge assembly comprising:
   a cartridge body;
   a stem slidingly disposed in the cartridge body, having a first end;
   a shutter that is integrally formed with the first end of said stem; and
   a substantially cylindrical sleeve configured to be rotatively disposed inside the hydraulic valve to face a passage gap, wherein the sleeve includes at least one first shaped opening formed in a portion of an outer cylindrical wall of the sleeve and suitable to enable adjustment of a maximum flow rate of the hydraulic valve within a first range of values according to a first graduate scale;
   wherein said sleeve comprises at least one second shaped opening formed in a portion of said outer cylindrical wall at a diametrally opposite position with respect to said first opening, and such to enable adjustment of the maximum flow rate of the valve within a second range of values according to a second graduate scale to preset two operative configurations of the valve alternative to each other, in two different fluid flow ranges or flow rate ranges; and wherein said first range of values through said first shaped opening is 50 l/h-400 l/h and said second range of values through said second shaped opening is 200 l/h-800 l/h.

13. The hydraulic valve according to claim 12, wherein said hydraulic valve is a Pressure Independent Control Valve (PICV).

14. The hydraulic valve according to claim 12, wherein at the flow rate adjustment of the sleeve according to said first graduated scale a first flow rate resolution is associated, whereas at said flow rate adjustment of the sleeve according to said second graduated scale a distinct second flow rate resolution is associated.

15. The hydraulic control valve according to claim 12, wherein the flowrate adjusting cartridge assembly further comprising said first graduated scale corresponding to the opening positions of said at least one first opening and said second graduated scale corresponding to the opening positions of said at least one second opening.

16. The hydraulic control valve according to claim 15, wherein said first and second graduated scales are at least one of represented on the flowrate adjusting cartridge assembly, and directly formed on the flowrate adjusting cartridge assembly.

17. The hydraulic control valve according to claim 12, wherein each of said at least one first opening and said at least one second opening comprises a plurality of openings formed in the wall of the sleeve.

18. The hydraulic valve assembly according to claim 12, wherein said sleeve is made of a material selected from the following group of materials: plastic, polymeric, thermoplastic, metal, or of other sintered materials.

* * * * *